July 4, 1939.   W. WILSON   2,164,366
FIXTURE CONNECTOR
Filed Oct. 11, 1937   8 Sheets-Sheet 2

INVENTOR.
Wesley Wilson
BY
Jones, Addington, Ames & Seibold
ATTORNEYS

July 4, 1939.  W. WILSON  2,164,366
FIXTURE CONNECTOR
Filed Oct. 11, 1937  8 Sheets-Sheet 4

Inventor
Wesley Wilson

July 4, 1939.  W. WILSON  2,164,366
FIXTURE CONNECTOR
Filed Oct. 11, 1937  8 Sheets-Sheet 5

Inventor:
Wesley Wilson

July 4, 1939. W. WILSON 2,164,366
FIXTURE CONNECTOR
Filed Oct. 11, 1937 8 Sheets-Sheet 6

Inventor:
Wesley Wilson
By Ames, Thiess, Olson & Mecklenburg
Attys.

July 4, 1939.　　　W. WILSON　　　2,164,366
FIXTURE CONNECTOR
Filed Oct. 11, 1937　　　8 Sheets-Sheet 8

Inventor:
Wesley Wilson

Patented July 4, 1939

2,164,366

UNITED STATES PATENT OFFICE 2,164,366

FIXTURE CONNECTOR

Wesley Wilson, Chicago, Ill.

Application October 11, 1937, Serial No. 168,444

8 Claims. (Cl. 248—319)

This invention relates to apparatus for connecting and disconnecting electrical fixtures disengageably secured to a ceiling and has particular reference to apparatus for connecting and disconnecting a lighting fixture which has readily engageable electrical and mechanical connector means, for connection with a ceiling unit.

This application is a continuation in part, so far as common subject matter is concerned, of my co-pending application Serial No. 690,056, filed September 19, 1933.

An object of this invention is to provide a form of apparatus or tool and a form of fixture for co-operation therewith which will enable detachable ceiling lighting fixtures to be readily attached and detached, both mechanically and electrically, without the use of a step-ladder or the like.

Further objects and advantages of the invention will be apparent from the following description when taken together with the accompanying drawings.

In the drawings, in which several forms of my invention are shown.

Referring more particularly to the drawings, and first to Figs. 1 to 5, inclusive, there is shown a ceiling unit 1, comprising an upper housing or canopy member 2 in the lower portion of which is positioned a substantially cup-shaped insulating base 3 having a central tapered slotted opening 4 in the bottom thereof. Wiring terminals 5 are positioned within the insulating base 3, to which the lead wires 6 are connected. The wiring terminals 5 are electrically connected to and position the contacts 7, which are preferably spring contacts extending within the insulating base 3. The slot 4 has shoulder portions 8 on each side thereof, which are adapted to support a lighting fixture assembly, as will be hereinafter described. A lower housing 9 is engageable with the lower end of the upper housing 2 extending downwardly some distance therefrom, and is provided with a central opening 10 in the bottom thereof.

A plate member 11, which is also provided with a central opening therein, is positioned above the lower housing 9.

The upper housing 2 is preferably formed with a reduced neck portion 12.

Figure 1:
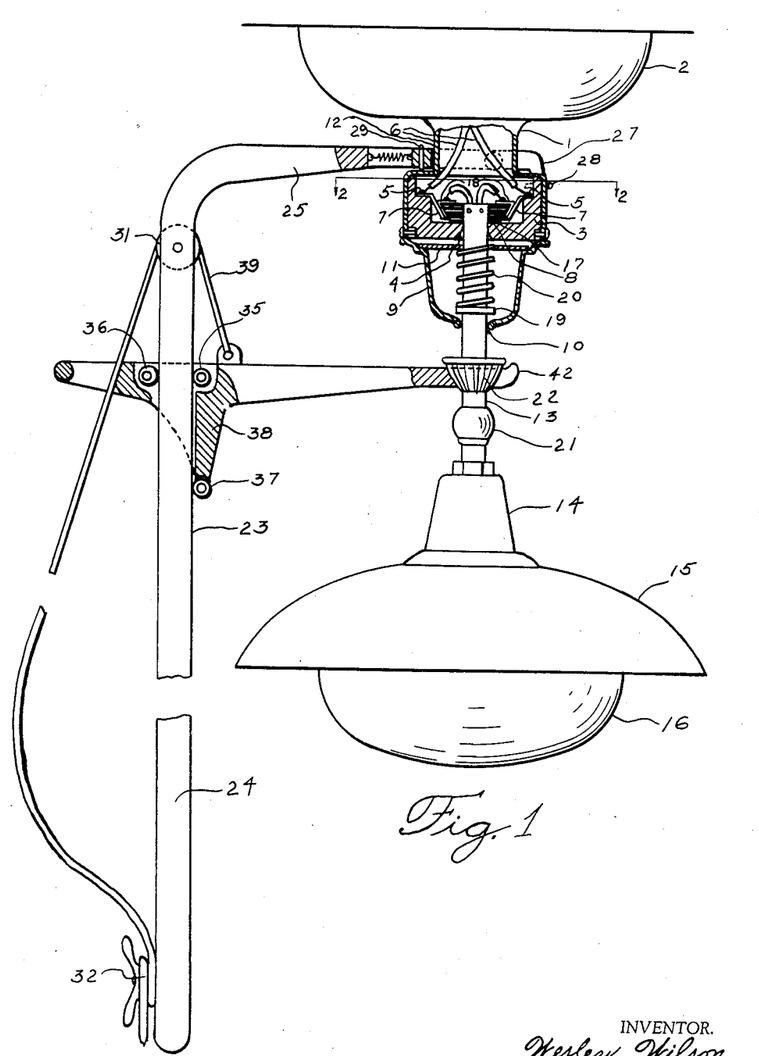
Figure 1 is a side elevational view, partly in section, of the apparatus embodying the present invention and a form of fixture adapted to be connected and disconnected thereby.

A lighting unit assembly is attached to the lower end of a hollow stem 13 and comprises the hood 14 in which is mounted a lamp receptacle, a reflector 15, and a globe 16. It is to be understood that the lighting fixture assembly is herein described merely for the purposes of illustration, as any other form desired may be employed equally well.

The stem 13 extends through the central openings in the lower housing member 9 and the plate 11, which openings are vertically aligned. A horizontal supporting member or crosshead 17 is secured to the upper end of the stem 13. The ends of the supporting member 17 are formed on a bias so as to taper inwardly toward the bottom, as shown in Fig. 1. The supporting member 17, when in the position shown in Fig. 1, rests on the shoulder portion 8, and thereby supports the lighting unit assembly. The width of the supporting member is less than the width of the slot 4 so that the supporting member may pass through the slots hereinbefore mentioned, which is done in attaching or detaching the lighting unit assembly from the ceiling unit.

Figures 2, 3, 4, 5:
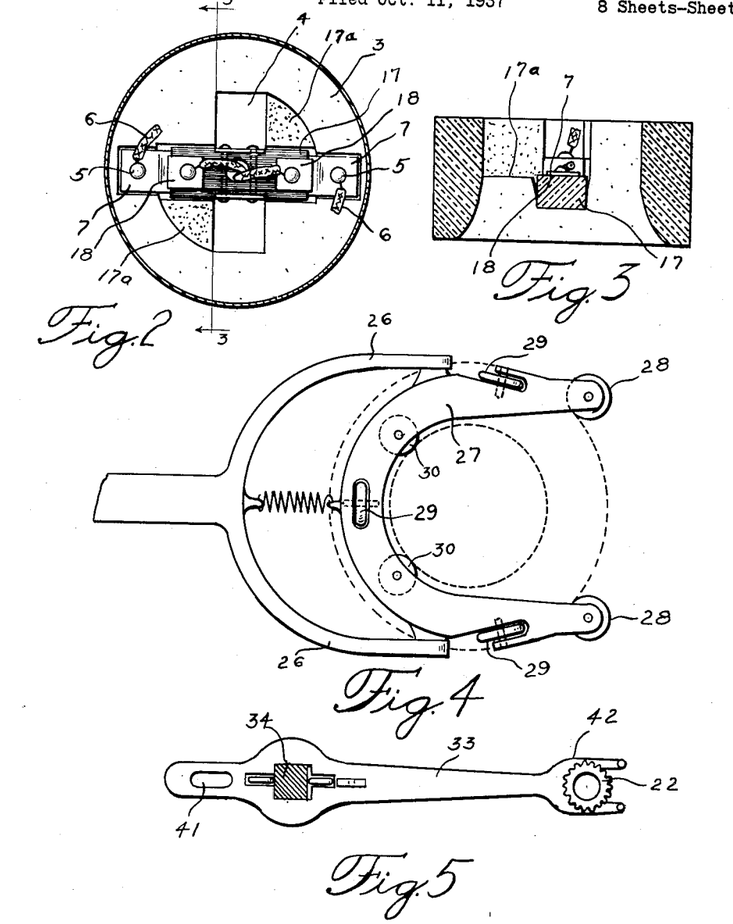
Fig. 2 is a top plan view taken substantially on line 2—2 of Figure 1.
Fig. 3 is a cross sectional view of the insulating base taken on the line 3—3 of Fig. 2.
Fig. 4 is a top plan view of the bifurcated positioning end of the guide member.
Fig. 5 is a top plan view of the carrier arm for gripping the fixture to connect and disconnect the same.

In making the connection, the crosshead 17 is lined up with the flaring entrance to the slot 4, the fixture stem 13 is pushed upwardly until the ends of the crosshead are above the level of the raised bosses 17a and the fixture stem is then given a quarter turn clockwise, as seen in Fig. 2, to bring the ends of the crosshead into registration with the spring contacts 7. The fixture stem is then allowed to drop down into the pockets in which the contacts 7 are located, thus establishing a reliable mechanical and electrical connection between the fixture and the ceiling unit. In making the connection, the plate 11 engages the lower face of the ceiling unit as the fixture stem is pushed upwardly, the spring 20 is compressed between the plate 11 and the shoulder 19. This spring tends to urge the stem downwardly, thus holding the contacts 18 on the crosshead 17 in engagement with the contacts 7 on the ceiling unit.

It has been found preferable to employ a ball joint 21 between the hood 14 and the lower end of the stem. With this construction, the connection between the ceiling unit and the lighting unit assembly will not be affected by any jarring of the lighting unit assembly.

Attached to the stem 13 above the ball joint 21 is a collar portion 22, which is preferably formed with a corrugated or fluted surface so that it may be easily gripped for rotating the stem to connect or disconnect the lighting unit assembly from the ceiling unit.

For attaching or detaching the lighting fixture above described, or any other fixture having electrical or mechanical connector means, the following apparatus may be employed. This apparatus comprises a guide member 23 having a vertical handle portion 24 and a horizontal positioning portion 25.

The positioning portion 25 comprises a pair of spaced arms 26 between which is pivotally mounted a yoke member 27 which, when in position, straddles the neck portion 12 of the ceiling unit. This yoke member is provided with a pair of rollers 28 having vertical axes for engagement with the side of the enlarged cylindrical lower portion of the ceiling unit, a set of three antifriction rollers 29 mounted on horizontal pivot pins and engaging the flat horizontal annular surface between the neck portion and the cylindrical portion, and a pair of rollers 30 having vertical axes and engaging the reduced neck portion 12 of the ceiling unit. The pivotal connection of the arms 26 with the yoke permits similar movement of the handle portion 24 without disturbing the engagement of the rollers on the yoke with the ceiling unit.

With this construction, the yoke 27 may be slipped about the neck portion 12 of the ceiling unit and dropped down so that the pair of rollers 28 engage the sides of the cylindrical lower portion of the ceiling unit, the set of three rollers 29 resting on the horizontal annular surface so that the guide member as a unit may be easily rotated or swiveled about the ceiling unit without any danger of its becoming disconnected or getting out of adjustment. This swiveling movement is for use in effecting a quarter turn of the fixture for connecting it and disconnecting it with respect to the ceiling unit, as explained more in detail hereinafter.

A pulley 31 is mounted in the upper end of the handle 24 of the guide member 23, and a cleat 32, preferably of the spring variety, is fastened to the lower outer side of the handle portion 24.

A fixture carrier comprising an arm 33 having an opening 34 therein through which the handle 24 extends is adapted to slide up and down on the handle 24. The handle 24 of the guide member is preferably made square or non-circular, and the opening 34 in the arm 33 is similarly shaped so that the arm cannot rotate with reference to the guide member. Three wheels 35, 36, and 37 are mounted on the arm 33 so that the same will roll up and down the handle 24 of the guide member 23, the wheels 35 and 36 being positioned on the front and rear sides of the handle 24, and the wheel 37 being mounted on the downwardly extending portion 38 of the arm 33. A rope or cable 39 is fastened at one end to the ear portion 49 on the upper side of the arm 33 and extends over the pulley 31; thence downwardly through an opening 41, which is adjacent the outer end of the arm 33, and is then fastened at the lower end to the cleat 32.

The outer end of the carrier arm 33 is bifurcated as at 42 so as to fit over the collar portion 22 on the stem 13 and engage the same in the manner of a wrench to enable the stem to be turned about its axis in connecting and disconnecting the fixture. The apparatus above described is used to disconnect the lighting fixture as follows:

The positioning portion 25 of the guide member 23 is positioned over the neck portion 12 of the upper housing member, the carrier arm 33 having been previously raised by means of the rope 39 above the lighting unit assembly. It is then positioned so that the bifurcated portion 42 engages the collar 22 on the stem 13. The cable 39 is then operated to lift the crosshead 17 out of engagement with the pockets in which the contacts 7 are located. By rotating the guide member 23 through a 90° arc, the supporting portion 17 is positioned parallel to the slot 4, after which the whole lighting unit assembly may be lowered by gradually easing the lower end of the rope 39, as the weight of the carrier arm and the lighting unit assembly will be sufficient to cause the carrier arm to slide down the handle 24.

In reassembling the lighting fixture with respect to the ceiling unit, a reverse series of operations is necessary. The fixture carrier 33 being in its lowered position and the forked portions 26 being properly positioned with respect to the ceiling unit, the collar portion 22 is placed in position in the seat formed by the bifurcations 42, the cable 39 is operated to elevate the fixture into proximity with the ceiling unit, and the handle 24 is swiveled about the ceiling unit to bring the crosshead 17 into alignment with the flaring entrance to the slot 4. The fixture stem is then given a slight additional upward lift to bring the crosshead above the level of the bosses 17a, the handle 24 is then swiveled through a quarter turn to bring the ends of the crosshead into registration with the pockets in which the contacts 7 are seated, and the carrier is then lowered to permit the contacts 18 to engage the contacts 7 and to disengage the seat 42 from the collar 22. The handle 24 is then disengaged from the ceiling unit, leaving the fixture in assembled and connected relation with respect to the ceiling unit.

By the construction shown and described, a detachable lighting fixture may be easily and quickly removed from its ceiling unit without the use of a stepladder or the like, thus saving time and energy in the operation.

Figures 6, 7, 8, 9:
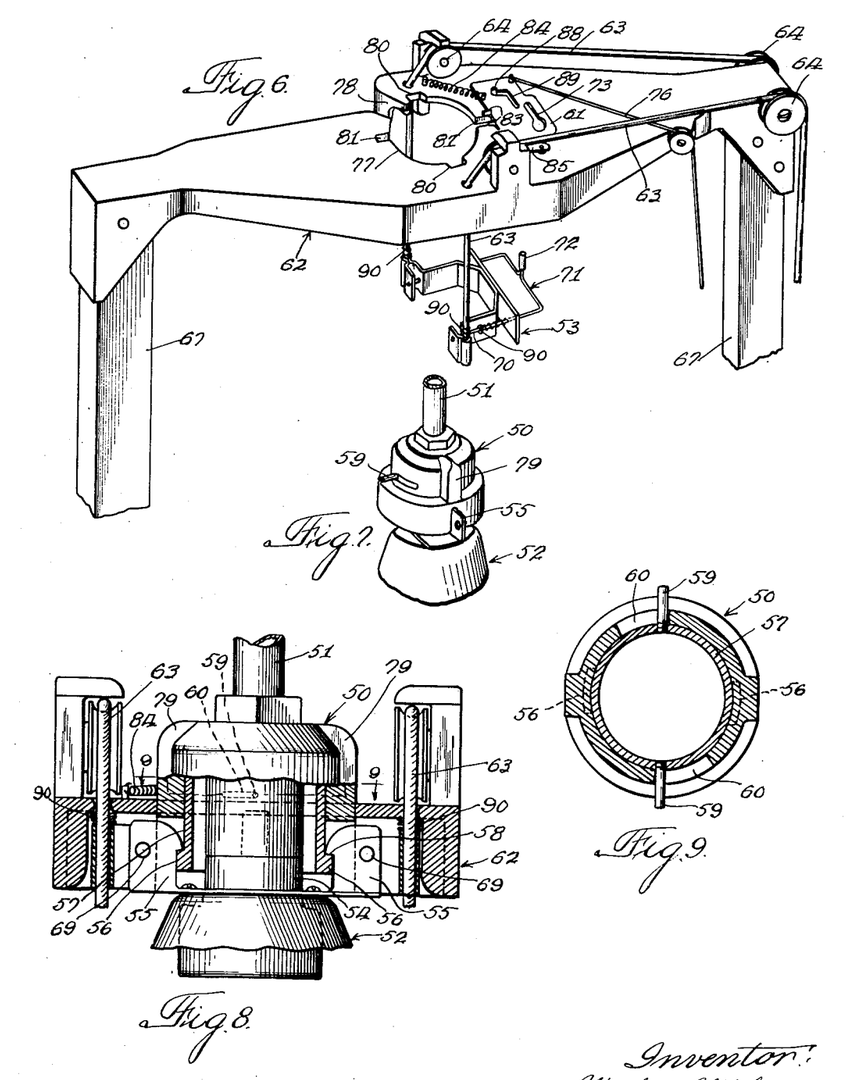
Fig. 6 is a perspective view showing the apparatus used in a modified construction.
Fig. 7 is a perspective view showing the reflector secured to the elevated unit.
Fig. 8 is a section on the line 8—8 of Fig. 10.
Fig. 9 is a section on the line 9—9 of Fig. 8.

Referring to the construction shown in Figs. 6 to 12, inclusive, the construction shown comprises an elevated unit 50 which may be suspended from a ceiling by means of the conduit 51, a fixture unit 52 having readily engageable and disengageable mechanical and electrical connections with respect to the elevated unit, and a tool having means for engagement with the elevated unit 50 and having a raising and lowering carriage 53 for bringing the lighting unit 52 into and out of engagement with respect to the elevated unit 50. The lighting unit has a plug portion 54 having contacts for engagement with corresponding electrical contacts on the elevated unit 50 and has a pair of upwardly extending ears 55 engageable and disengageable with respect to extending lugs 56 on a sleeve 57 swiveled in the elevated unit (Figs. 8 and 9). For effecting the slight swiveling movement of this sleeve necessary to effect engagement and disengagement of the laterally extending lugs 56 with the downwardly facing shoulders 58 on the ears 55, a pair of pins 59 are provided, secured to this sleeve 57 and extending through arcuate slots 60 in the body or hood portion of the elevated unit. When the pins 59 and laterally extending lugs 56 are in the position shown in Fig. 9, they are in position to hold the lighting fixture connected. When the pins are turned to move the sleeve 57 counterclockwise, as viewed in Fig. 9, the laterally-extending lugs are moved to disconnecting position with respect to the ears 55 on the lighting fixture. As will be pointed out hereinafter, the pins 59 are engageable with an operating plate 61 on the crosshead 62 of the tool so that by movement of this operating plate 61 the swiveled sleeve 57 may be moved either to connecting or disconnecting position; also, as will be pointed out hereinafter, this operating plate 61 not only controls the connection and disconnection of the lighting fixture 52 with respect to the elevated unit 50 but also controls the connection and disconnection of the raising and lowering carriage 53 with respect to the lighting fixture 52.

The raising and lowering carriage 53 is moved up and down by means of a pair of cords 63 secured to the carriage 53 extending through openings in the crosshead 62 and over pulleys 64 in the crosshead. These two cords may be secured together after passing over the pulleys and connected with a single cord 65 passing over the drum 66 mounted on one of the uprights or poles 67 secured to the crosshead 62. This raising and lowering drum is operated by a suitable crank 68.

One pole 67a is hinged at the top to the crosshead 62 and provided with a locking hook 67b which permits it to lock the two bottom ends of the poles 67 and 67a together, so as to provide easy transportation of the lowering device.

For connecting the raising and lowering carriage 53 to the lighting fixture 52, the ears 55 on the lighting fixture are provided with openings 69 for engagement with the pins or arms 70 of a yoke member 71 which is slidably mounted in suitable openings in the carriage 53. This yoke member 71 has an upwardly extending pin 72 which engages an opening 73 in the operating plate 61 when the carriage 53 is raised up into engagement with the crosshead 62.

Figure 10:
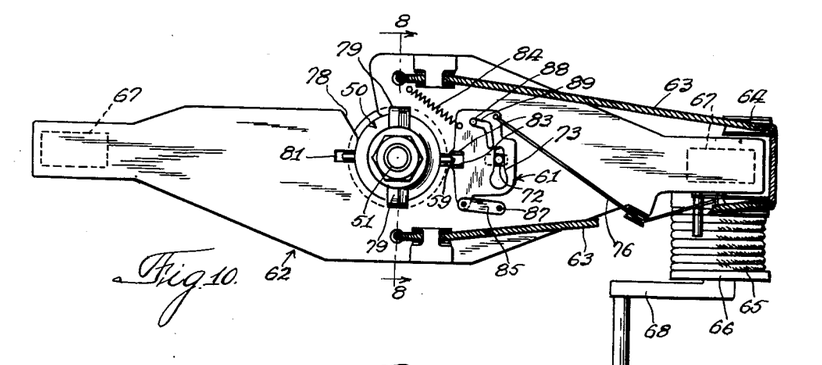
Fig. 10 is a plan view of the apparatus used, showing it in position on the elevated unit.

Before describing in further detail the structure, I will briefly outline the operation. It will be assumed that the lighting fixture 52 is in connected position with respect to the elevated unit 50 and that it is desired to disconnect and lower the lighting unit 52 for purposes of cleaning or replacement and then to raise the lighting unit back into position with respect to the elevated unit 50 and to connect it with respect thereto, and thereafter to remove the tool from the elevated unit. For this purpose, the operator turns the crank 68 to draw the carriage 53 up to the crosshead 62, and operates the lever 74 to enable the latch 75 to hold the drum 66 against rotation and to draw the cord 76 attached to the operating plate 61 to move the operating plate to the position shown in Fig. 10. He then grasps the tool by means of the two uprights 67 and slips the crosshead 62 into position above the elevated unit 50 and then downwardly over the elevated unit. In this operation the upper part of the elevated unit 50 enters the circular opening 77 in the crosshead, the opening 78 in the crosshead leading to the circular opening 77, enabling the passage of the conduit 51 therethrough. The crosshead is definitely positioned with respect to the elevated unit by means of the lugs 79 on the elevated unit which engage notches 80 in the crosshead. As the operating pins 59 are in connecting position, these pins can pass through the notches 81 in the crosshead. In the operation just described, the carriage will be pulled up so as to lie snugly against the crosshead and held in this position by means of the latch 75 engaging a toothed wheel 82 rotatable with the raising and lowering drum 66. When the crosshead is finally positioned on the elevated unit, one of the operating pins 59 will lie between the upwardly-extending ears 83 on the operating plate 61, as shown in Fig. 10. The general plane of the plate 61 lies below this operating pin 59 for a purpose to be explained later.

With the parts in this position, the operator moves the lever 74 counterclockwise away from stop 74a, which releases the cord 76 which is holding the operating plate 61 against the tension of the coil tension spring 84 and also releases the latch 75 which is holding the raising and lowering drum 66. When the operating plate is released to move under the action of the spring 84, it acts first to connect the carriage 53 with the lighting fixture 52 and thereafter to disconnect the lighting fixture 52 from the elevated unit 50.

As previously explained, when the carriage 53 is pulled up snugly against the crosshead 62, the upwardly extending pin 72 on the slidable yoke 71 engages the slot 73 in the operating plate 61. This operating plate is guided in its movement by a link 85 pivotally secured at 86 to the operating plate and pivotally secured at 87 to the crosshead and by means of a pin 88 extending upwardly from the crosshead into an L-shaped slot 89 in the operating plate. The position of the operating plate before release is shown in Fig. 10. When the operating plate is released by loosening up the cord 76, the first part of the movement of the operating plate will move it from the position shown in Fig. 10 to a position in which the guide pin 88 lies at the apex of the angle of the L-shaped slot 89. This first movement will cause the operating plate to move the upwardly extending pin 72 on the slidable yoke 71 to a position which will enable the connecting pins 70 to enter the openings 69 in the ears 55 on the fixture, due to the action of the springs 90, thus connecting the fixture 52 to the carriage 53. Further movement of the operating plate 61 will bring the pin 88 on the crosshead to the opposite end of the L-shaped slot and will cause a partial rotation of the fixture connecting sleeve 57 to disconnect the fixture 52 from the elevated unit 50, this movement being accomplished by the engagement of the upwardly extending ears 83 on the plate 61 with the laterally extending operating pin 59. The first part of the movement of the operating plate 61 will bring the flat part of the operating plate underneath the pin 59 so that the tool cannot then be removed from the elevated unit. It will be noted that the construction is such that the lighting unit cannot be disconnected from the elevated unit until the lighting unit is connected with the carriage. This prevents any possibility of the lighting unit being dropped. This is because if pins 70 should move forward to strike the face of 55 but fail to pass through hole 69 then 72 would prevent plate 61 from moving forward until pin 88 reached the apex of slot 89.

Figure 11:
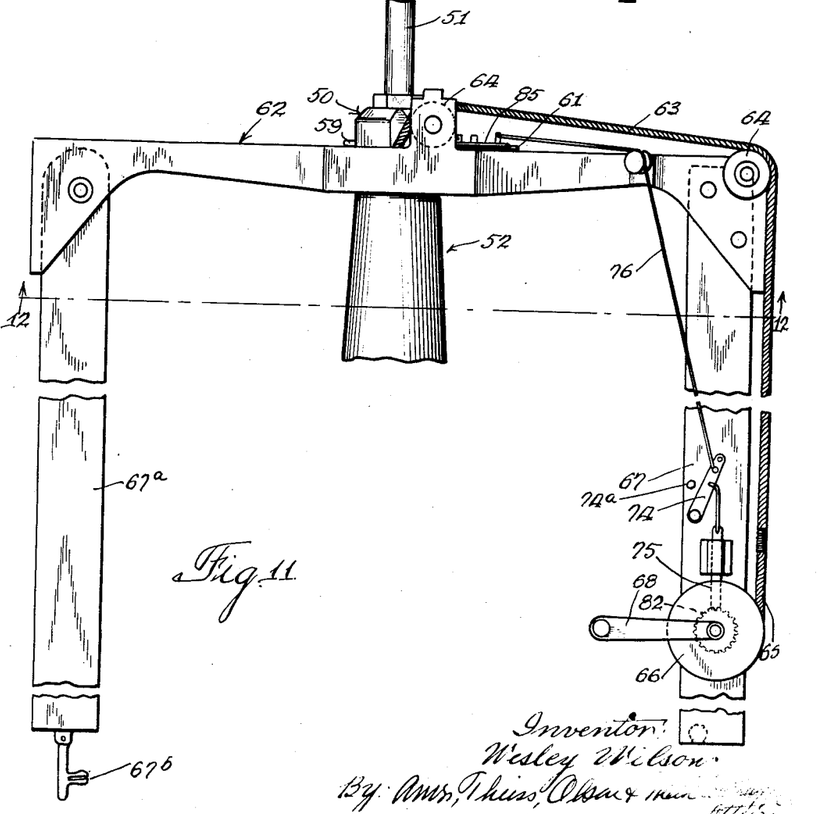
Fig. 11 is a side elevation of the apparatus showing the elevated unit and reflector neck.
Figure 12:
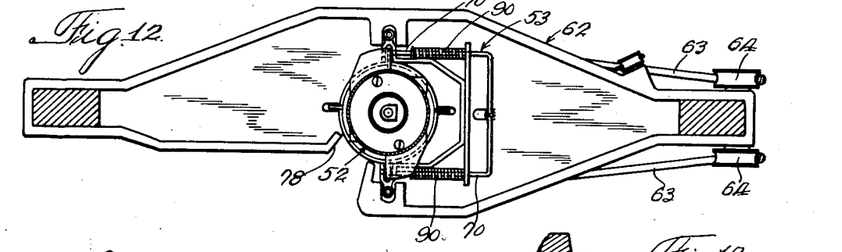
Fig. 12 is a section on the line 12—12 of Fig. 11.

After the lighting unit 52 has thus been connected with the carriage 53 and disconnected from the elevated unit 50, the lighting unit may be lowered by permitting rotation of the drum-operating crank 68 in a counterclockwise direction, as viewed in Fig. 11. After the operator has done whatever is necessary with respect to the lighting fixture and is ready to connect it again with the lighting unit, he will turn the drum crank clockwise, as seen in Fig. 11, to raise the fixture into connecting position with respect to the elevated unit 50. As the fixture is raised the ears 55 on the fixture will come into the position shown in Fig. 8, the cords 63 guiding the fixture into proper position with respect to the elevated unit. When the fixture has been raised into connecting position, the operator turns the lever 74 in a clockwise direction to the position shown in Fig. 11, thus moving the operating plate 61 to the position shown in Fig. 10 and latching the winding drum 66, as shown in Fig. 11. The first part of the movement of the operating plate will rotate the connecting sleeve 57 clockwise, until it is in the position shown in Figs. 8 and 9, which will connect the fixture 53 with the elevated unit 50. The latter part of the movement of the operating plate 61 will act on the pin 72 of the yoke 71 to withdraw the pins 70 from the holes 69 in the ears 55 on the fixture, thus disconnecting the fixture from the raising and lowering carriage. The latter part of the movement of the operating plate 61 also moves it from underneath the pin 59 so that the tool may then be removed from its position with respect to the elevated unit, leaving the fixture in connected position with respect to the elevated unit.

In order to insure registration of the connecting pins 70 with the holes 69 in the ears 55 on the fixture, a pair of coil compression springs 90 may be provided surrounding the elevating cords 63 and located between the carriage 53 and crosshead 63, which springs 90 will tend to press the carriage away from the crosshead as shown in Fig. 8 when the tension on the raising and lowering cords 63 is released, thus insuring that the pins 70 on the carriage will line up with the holes 69 on the ears on the fixture. It should be noted that it will be impossible to cause plate 61 to move to the released position until pin 59 moves to the locked position and in every respect the construction is fool-proof even though being operated by an inexperienced operator.

Figures 13, 14, 15, 16, 17, 18:
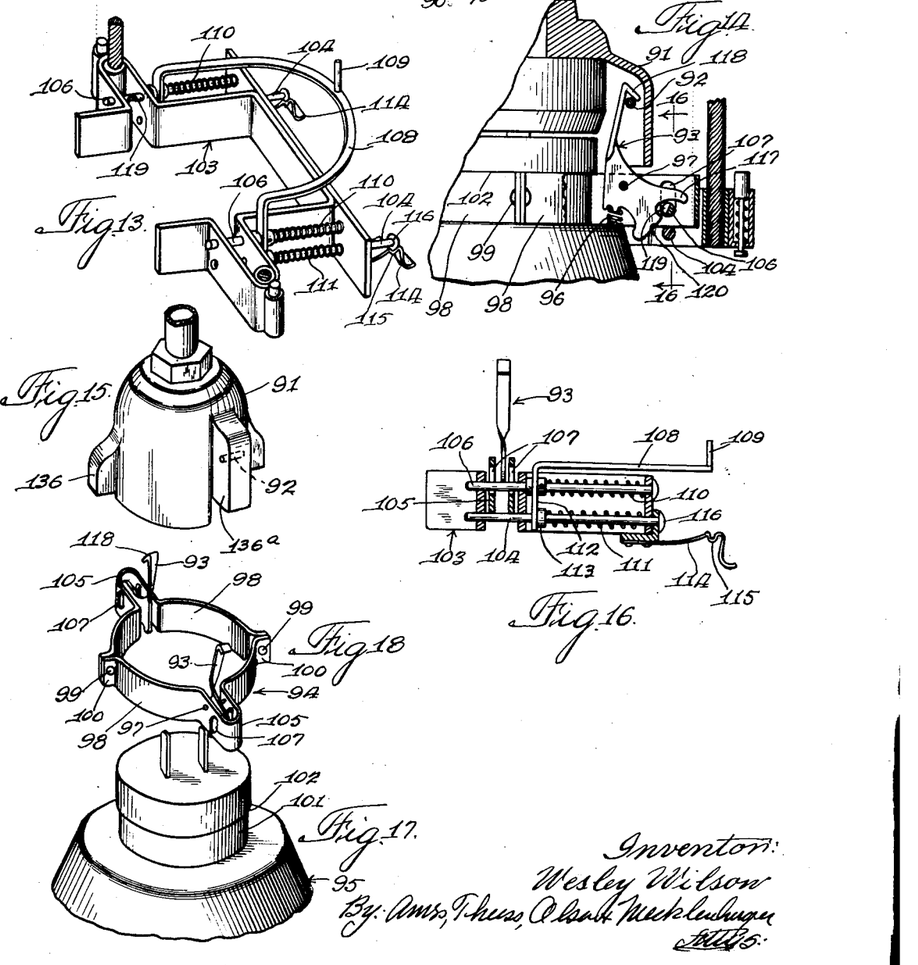
Fig. 13 is a perspective view showing another form of the raising and lowering carriage.
Fig. 14 is a side elevational view, partly in section, showing the lighting unit in position with respect to the elevated unit and showing part of the raising and lowering carriage.
Fig. 15 is a perspective view of the elevated unit of Fig. 14.
Fig. 16 is a detail section substantially on the line 16—16 of Fig. 14.
Fig. 17 is a perspective view of the upper part of the lighting unit.
Fig. 18 is a perspective view of a connecting member to be permanently secured to the lighting unit.

In Figs. 13 to 18 is shown a somewhat different form of elevated lighting unit and carriage. The carriage may be used with the crosshead and associated parts shown in Figs. 6 to 12, inclusive. In this form, the fixture is connected with the elevated unit by means of a latching action. For this purpose the elevated unit 91 is provided with a pair of pins 92 which is engageable by pivoted latches 93 mounted on a connecting ring 94 permanently secured to the lighting fixture 95. Suitable coil compression springs 96 are provided, acting between these pivoted latches 93 and the upper surface of the fixture 95 and tending to hold the latch members 93 in latching position, as shown in Fig. 14. The latches are mounted on suitable pivot pins 97 on the connecting ring 94 which is secured to the lighting unit 95. The connecting ring comprises a pair of straps 98 which may be secured together and to the lighting unit 95 by means of screws or rivets 99 extending through ears 100 on the straps. The straps may fit about a reduced portion 101 on the lighting unit, the upper edges of the straps lying beneath the annular shoulder 102 on the lighting unit.

The carriage 103 to which the lighting unit may be connected, shown in perspective in Fig. 13, comprises a strap-like frame portion, a pair of pins 104 slidably mounted in this frame for engagement with the lower edges of the laterally-extending loops 105 on the connector straps, and another pair of pins 106 slidably mounted in the carriage 103 for engagement with suitable slots 107 in the loop portions 105 of the straps. The lower pair of pins 104 are used in raising the fixture 95 into position with respect to the elevated unit 91 and the upper pair of pins 106 are used for lowering the fixture away from the elevated unit. The upper set of pins 106 are secured to an operating yoke 108 which has an upwardly extending pin 109 corresponding to the pin 72 of Figs. 6 to 12, inclusive, which operating pin 109 engages the slot 73 in the operating plate 61 when the carriage 103 is in raised position adjacent the cross-head 62. Suitable springs 110 are provided tending to hold the upper pair of pins 106 in connected position. Also, suitable springs 111 are provided tending to hold the lower pair of pins 104 in connected position, as shown in Fig. 16. Means are provided, as shown in Fig. 16, whereby when the upper pair of pins 106 are moved to disconnecting position, the lower pair 104 also will be moved to disconnecting position but whereby the upper pair of pins 106 may be moved to connecting position without causing the lower pair of pins 104 to be moved to connecting position. For this purpose, the operating yoke 108 is provided with a pair of downwardly extending fingers 112 secured to the upper pins 106 and having openings through which the lower pair of pins 104 may extend, these fingers 112 engaging shoulders or collars 113 secured to the lower pair of pins 104. Means are also provided whereby the lower pair of pins 104 may be held in releasing position when desired comprising a pair of leaf spring latch members 114 having U-shaped portions 115 for receiving the heads 116 of the pins, as shown in Fig. 13.

Before describing the construction more in detail, I will briefly outline the operation. It will be assumed that the fixture 95 is in connected position with respect to the elevated unit 91, as shown in Fig. 14, and that it is desired to disconnect the fixture from the elevated unit and lower it. It is further assumed that carriage 103 is pulled up in position against crosshead 62 and lever 74 is in the locked position thus holding pins 104 and 106 in the open position. The operator will then slip the crosshead into position with respect to the elevated unit, substantially as described in connection with Figs. 6 to 12, inclusive. The operator then turns the lever 74 counterclockwise from the position shown in Fig. 11 to release the winding drum 66 and to cause the operating plate 61 to move the pin 109 lying in the slot 73 to a position in which the upper pair of pins 106 will move to connecting position underneath the extensions 117 of the latch members 93 (Fig. 14). The leaf spring latches 114, however, will hold the lower pair of pins 104 in withdrawn position. The operator will thereupon turn the winding drum 66 slightly clockwise, as viewed in Fig. 11, to bring the upper pair of pins 106 against the lower edges of the extensions 117 of the latches, thus releasing the latches from engagement with the pins 92 on the elevated unit. The slots 107 in the connecting ring 94 enable this unlatching movement of the latch members 93. The fixture is now supported by the upper pair of pins 106 in engagement with the lower edges of the lateral extensions 117 on the latches and also upper edges of slot 107. The fixture can now be lowered by permitting the winding drum 66 to rotate in a counterclockwise direction.

After the fixture has been serviced and it is desired to raise it again into connected position with respect to the elevated unit, the carriage 103 is connected with the fixture 95 in such a manner that the fixture will be supported by the lower pair of connecting pins 104. For this purpose the leaf spring detents 114 are operated to release the lower pair of pins 104 so that the fixture will be supported as shown in Fig. 16 by the engagement of the lower pair of pins 104 with the lower edges of the laterally extending loops 105 on the connecting ring 94.

With the fixture thus connected with the carriage, the winding drum 66 is rotated clockwise, as viewed in Fig. 11, to bring the fixture 95 into position with respect to the elevated unit 91, as shown in Fig. 14. As the upper end of the latch member 93 approaches the pin 92 on the elevated unit, its slanting surface 118 will strike the pin 92 and after the upper end of the latch is past the pin, the compression spring 96 will snap the latch member 93 over into the latched position shown in Fig. 14. When the fixture has been thus latched up to the elevated unit, the lever 74 is operated to cause the latching of the winding drum and to cause the withdrawal of both upper and lower pairs of latching pins 106 and 104. The tool can then be removed from the elevated unit, as described in connection with Figs. 6 to 12, inclusive.

In connecting the fixture to the elevated unit, in order to prevent withdrawal of the latching pins 104 and 106 in the event that the latch members 93 do not properly engage the pins 92 on the elevated unit and thus prevent the fixture from being disconnected from the carriage unless it has made proper connection with the elevated unit, each upper connecting pin 106 is provided with a notch 119 which registers with an arcuate portion 120 of the latch member 93 when the latch pins 104 and 106 are in locked position. This notch 119 enables the latch member 93 to oscillate when the notch 119 is in alignment with the extension 120 on the latch member 93 and prevents withdrawal of the latch pin 106 when this extension 120 on the latch lies in the notch 119 on the pin. With this construction it will be seen that as the slanting surfaces 118 of the latch member 93 approach and strike the pin 92 on the elevated unit, the latch member 93 will be oscillated and the extension on this latch will enter the notch 119 on the pin 106 and prevent withdrawal of the pin in case the latch member should fail to snap over into the latching position shown in Fig. 14. This construction will therefore prevent withdrawal of the pins 106 and 104 connecting the fixture with the carriage unless the latch member 93 has snapped over to connect the fixture with the elevated unit. This will prevent accidental dropping of the fixture in case the latch members 93 fail to operate or through other faulty operation of the lowering device.

Figure 19:
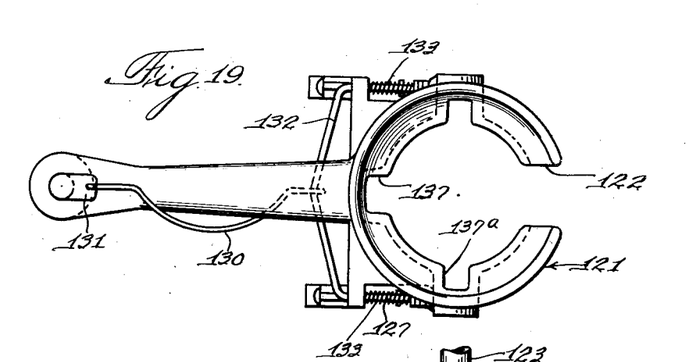
Fig. 19 is a plan view showing another form of tool.
Figure 20:
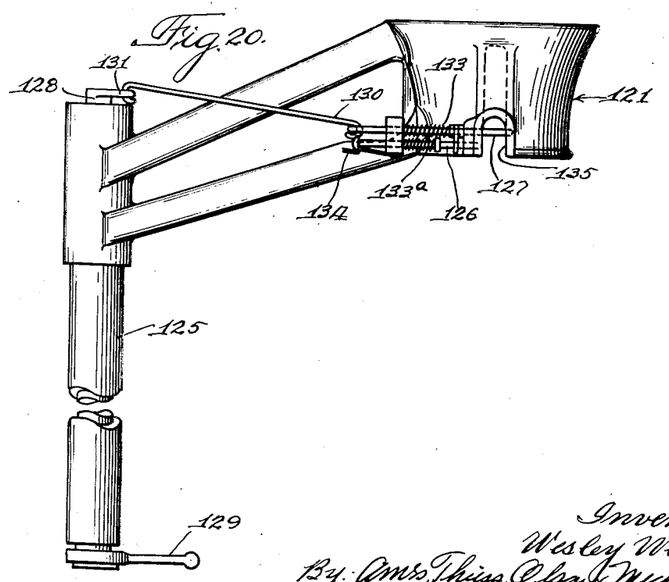
Fig. 20 is a side elevational view of the tool shown in Fig. 19.
Figure 21:
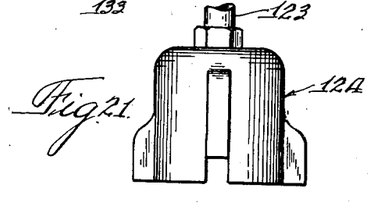
Fig. 21 is a side elevational view of an elevated unit for use with the tool of Figs. 19 and 20.
Figure 22:
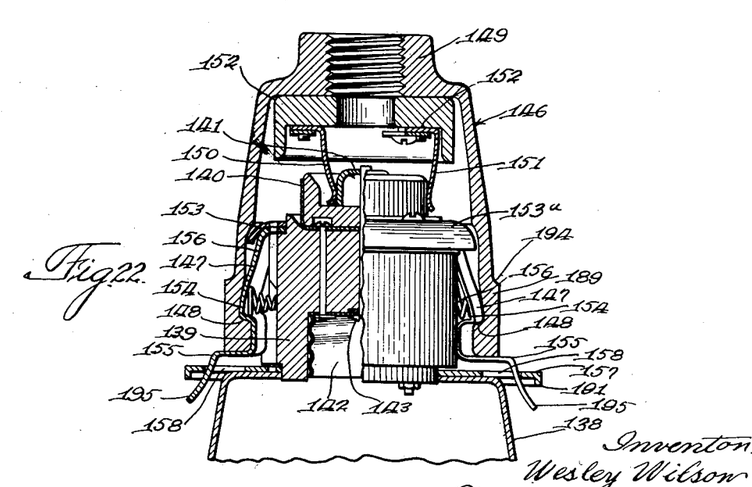
Fig. 22 is an axial sectional view showing another form of elevated unit and lighting unit.
Figure 23:
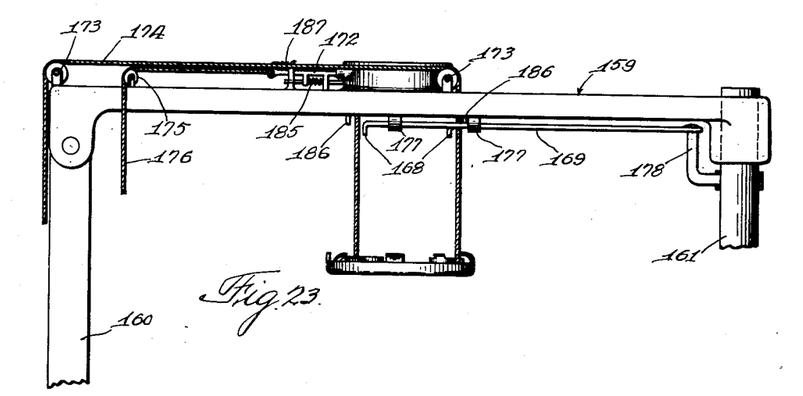
Fig. 23 is a side elevational view showing apparatus to be used with the construction of Fig. 22.
Figure 24:
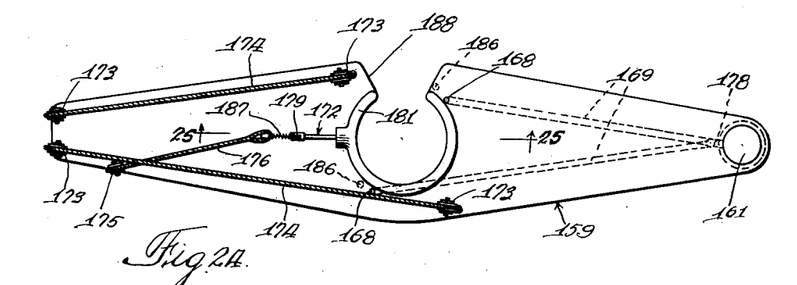
Fig. 24 is a plan view of the apparatus of Fig. 23.

In Figs. 19, 20 and 21 is shown a construction in which the tool is not anchored with respect to the elevated unit but in which the fixture is first secured to a holder mounted on the upper end of the pole, the holder then being slipped up underneath and over the elevated unit, leaving the fixture in connected position with respect to the elevated unit. The fixture, and elevated unit as shown in Figs. 14, 15, 17, and 18, may be used with this tool. The tool shown comprises a funnel-like member 121 having an opening 122 on one side to enable it to be slipped off past the supporting conduit 123 of the elevated unit 124, a handle or pole 125 on which this funnel member 121 is mounted, two pairs of latch pins 126 and 127 slidably mounted adjacent the funnel-shaped member 121, and means for controlling these latch pins comprising a rock shaft 128 rockably mounted in the pole 125, an operating handle 129 for the rock shaft, and a link 130 connected at one end with the rock arm 131 on the rock shaft and pivotally connected at the other end with a yoke portion 132 connecting the upper pair of latch pins 127. Coil compression springs 133 surrounding the upper latch pins 127 tend to hold these latch pins in connecting position and coil compression springs 133a surrounding the lower pair of latch pins 126 tend to hold these pins in latching position. Means are provided for holding the lower pair of latch pins 126 in withdrawn position comprising leaf spring detents 134 similar to the leaf spring detents 114 shown in Fig. 16.

In using this tool, assuming that the fixture 95 of Figs. 17 and 18 is connected to the elevated unit, as shown in Figs. 14 and 15, and it is desired to disconnect and lower the fixture. The spring pins 127 are withdrawn from latching position by operating lever 129, the lower pins 126 being latched in unlatched position by the leaf springs 134; the funnel-like member 121 is raised and slipped laterally past the stem 123 which supports the elevated unit 124 and the funnel-like member is then lowered to cause the loop portions 105 of the connecting ring 94 to enter the recesses 135 in the lower edge of the funnel-like member. The funnel-like member will be guided and positioned in this movement by the engagement of the lateral projections 136 and 136a on the elevated unit 91 in the notch 137 and 137a in the funnel-like member. When the loop portions 105 of the connecting ring 94 have entered the recesses 135 in the funnel-like member, the lever 129 is operated to enable the springs 133 to force the upper latch members 127 underneath the extensions 117 of the latch members 93, the lower latch pins 126, however, remaining in withdrawn position due to the leaf spring latches 134. The supporting pole is then pushed upwardly slightly to cause the latch pins 127 to lift up on the lateral extensions 117 of the latches 93, thus releasing the latches from the pins 92 in the elevated unit and causing the weight of the fixture to be supported by the upper latch pins 127 on which the lateral extensions 117 of the latches 93 bear. The fixture is thus disconnected from the elevated unit and is supported by the upper latch pins 127 in the funnel-like member. The pole 125 can then be manipulated to lower the funnel-like member 121, carrying the lighting unit with it.

After the lighting fixture has been serviced and it is desired to reconnect it with the elevated unit, the fixture is connected to the funnel-like member by means of the lower pair of latch pins 126 which will extend underneath the lower edges of the loop portions 105 of the connecting ring, the upper latch pins 106 extending through the slots 107 in the loops 105. The pole is then manipulated to cause the insertion of the latch members 93 into proper position with respect to the latch pins 92 on the elevated unit, these latches 93 snapping into place over the pins 92 to connect the lighting unit with the elevated unit. After this connection has been made, the latch lever 129 is operated to withdraw all of the latch pins 126 and 127, thus disconnecting the funnel-like member from the fixture. The funnel-like member 121 can then be pushed upwardly above the elevated unit 124 and can then be moved laterally to disengage the funnel-like member from the elevated unit and its supporting stem 123, the opening 122 in the side of the funnel-like member enabling this manipulation. The funnel-like member 121 can be made to flare out larger so as to make it still easier to re-install the fixture.

In Figs. 22 to 26, inclusive, is shown another form of elevated unit, fixture, and tool. In this form the lighting fixture can be connected to the elevated unit in any position of rotative adjustment and the tool may be applied to the elevated unit in any position of rotative adjustment. Referring, first, to the fixture and elevated unit shown in detail in Fig. 22, the fixture shown comprises the shade or reflector 138, a lamp socket 139 secured thereto, concentric contacts 140 and 141 electrically connected with the lamp contacts 142 and 143, respectively, for engagement with corresponding contacts 150 and 151 on the elevated unit 146, and a pair of spring-pressed latch members 147 for detachable engagement with an upwardly facing annular internal shoulder 148 on the cup-like elevated unit. The elevated unit 146 comprises a cup-like housing having an internally threaded portion 149 for connection with the supporting conduit, contacts 150 and 151 for engagement with the concentric contacts 140 and 141 on the lighting unit, and wiring terminals 152 for these contacts. Each of the spring-pressed latch members comprises a sheet metal member pivotally mounted on the lighting fixture at 153 it being loosely held between ring 153a and the insulated socket base 139 at 153, and having a shoulder portion 154 for engagement with the annular shoulder 148 on the elevated unit and having a tool-engaging portion 155 for enabling disconnection to be made with respect to the elevated unit. A coil compression spring 156 is provided, tending to hold the latch member 147 in latching position. The lighting unit is provided with a disc-like member 157 secured above the reflector neck, the edge of which disc is engageable with the raising and lowering carriage. This disc has openings 158 through which the lower ends of the latch members extend and in which they operate.

The tool comprises a crosshead 159 which may have secured thereto crosshead supporting uprights 160 and 161 similar to the crosshead supporting members shown in Fig. 6. The fixture supporting carriage comprises an arcuate frame 162 having an opening 163 (Fig. 26) for the passage of the stem that supports the elevated unit 146 and provided with three inwardly-extending upper lugs 164 for engagement with the upper surface of the fixture-supporting flange 157 and having a pair of pivoted latch members 165 for engagement with the lower surface of the fixture-supporting flange 157. The latch members are provided with springs 166 which tend to hold the latch members in latching position. Each latch member 165 is also provided with an extension 167 for engagement with the downwardly-extending tips 168 of the operating links 169 when the carriage is drawn up to the crosshead. The arcuate member 162 is also provided with an upwardly-extending abutment member 170 for cooperation with a downwardly-extending arm 171 on a slide 172 mounted on the crosshead 159, as will be pointed out more fully hereinafter.

The crosshead is provided with pulleys 173 for the cords 174 which operate the raising and lowering carriage. It is also provided with a pulley 175 for the cord 176 which operates the slide 172, this cord 176 corresponding to the cord 76 shown in Fig. 11 and being operated by a lever similar to the lever 74 of Fig. 11. This lever may cooperate with a latch for the winding drum, also as shown in Fig. 11. The crosshead is also provided with suitable guides 177 for the latch operating links 169 and with a rock arm 178 for operating these links. This rock arm 178 may be carried by the upright 161, which is rockably mounted in the crosshead.

Figure 25:
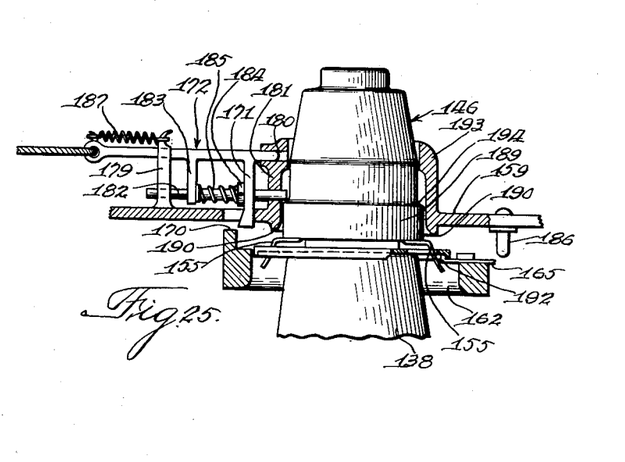
Fig. 25 is a section substantially on the line 25—25 of Fig. 24.
Figure 26:
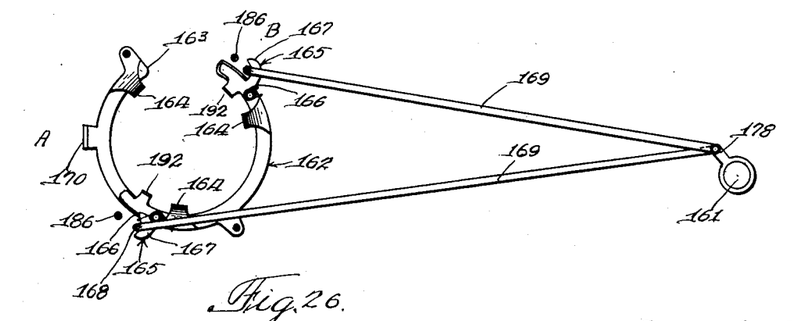
Fig. 26 is a somewhat diagrammatic view showing the raising and lowering unit in position with the actuating mechanism on the crosshead.

The slide member 172 is slidably mounted on the crosshead, as shown in Fig. 25. The upper portion of this slide is mounted in a post 179 extending upwardly from a crosshead and an opening 180 in the annular collar portion 181 of the crosshead. A lower slide 182 is provided controlled by the upper slide 172 but mounted for movement relative thereto, this lower slide 182 being slidably mounted in openings in the post 179 and in the annular collar portion 181 of the crosshead. This lower slide 182 extends through openings in the downwardly extending arms 171 and 183 of the upper slide 172. A collar 184 is mounted on this lower slide 182, and a coil compression spring 185, acting between this collar 184 and the downwardly-extending arm 183, tends to hold the lower slide in the position shown in Fig. 25. On the crosshead 159 are mounted two downwardly extending pins 186 which cooperate with the latch members 165 to prevent unlatching of the fixture from the elevated unit in case the latch members 165 are not in latching position with respect to the fixture and to prevent unlatching movement of the latch members 165 when the crosshead is slipped downwardly to unlatch the fixture from the elevated unit.

In use, assuming that it is desired to disconnect the fixture from the elevated unit, lower it, service it, elevate it, and again connect it with the elevated unit, the winding drum 66 is operated to raise the carriage 162 up against the crosshead 159 and is then latched in this raised position by means of the lever 74, this latching action at the same time causing the withdrawal of the slide 172 against the tension of the spring 187. The operator then manipulates the uprights 160 and 161 which support the crosshead 159 so as to slip the crosshead over the supporting stem, the opening 188 in the crosshead permitting this operation, and the crosshead is then lowered to bring the annular collar portion 181 about the elevated unit until the downwardly extending arm 171 on the slide 172 engages the upper portion of the abutment 170 on the carriage 162 (Fig. 25). Then the lever 74, which controls the winding drum latch 75 and the slide 172 on the crosshead, is operated to release the winding drum 66 and to allow the slide 172 to move inwardly. This initial movement of the slide 172 causes the downwardly-extending arm 171 to disengage the upper portion of the abutment 170, but the lower slide 182 does not move inwardly as it has dropped down so low that it engages the enlarged portion 189 of the elevated unit. The crosshead 159 thereupon drops down and thus brings the lower edge 190 of the annular portion of the crosshead into engagement with the extensions 155 on the latches 147, thus causing the latches 147 to become disengaged from the annular shoulder 148 on the elevated unit.

If the latch members 167 have failed to move under the flange 157 of the fixture, the latch members 167 will lie directly underneath the pins 186 on the crosshead and will prevent the crosshead from dropping down far enough to unlatch the latch members 147, thus insuring that the fixture will not be unlatched from the elevated unit unless it has already been latched to the carriage 162. If, however, the latch members 167 have moved under the flange 157 prior to the dropping of the crosshead, the lower ends of the pins 187 will move down past the edges of the latch members 167 when the crosshead is dropped and will prevent unlatching movement of the latch members 167 in this position. When the fixture is thus released from the elevated unit, the flange 157 on the fixture drops down and rests on the latch members 165 on the carriage, the downwardly extending flange 191 on the disc 157 preventing unlatching movement of the latching members 165 by engagement of the upwardly extending portions 192 on the latch members 165 with this downwardly extending flange 191. The winding drum 66 can then be operated to lower the fixture away from the elevated unit. The crosshead 159 remains supported on the elevated unit 146, the shoulder 193 of the crosshead resting on the shoulder 194 of the elevated unit.

After the fixture has been serviced and it is desired to raise the fixture and reconnect it with the elevated unit, the poles 160 and 161 on the fixture tool are raised to push the crosshead 159 upwardly until the lower slide 182 on the crosshead engages above the shoulder 194 on the elevated unit. The winding drum 66 is then operated to raise the carriage 162 and the fixture supported thereby into latching position with respect to the elevated unit 146 as shown in Fig. 25. In order to free the carriage from the fixture, the lever 74 on the pole is operated to latch the winding drum 66 and to pull the slide 172 to the left, (as viewed in Figs. 23 and 25) to bring the downwardly extending arm 171 above the upper portion of the abutment 170 and to withdraw the lower slide 182 from engagement with the shoulder 194 on the elevated unit. This allows the crosshead to drop down until the downwardly extending arm 171 rests on the upper portion of the abutment 170, the weight of the crosshead 159 and carrier 162 being then supported by the lugs 164 on the fixture carrier, which lugs rest on the upper surface of the flange 157 on the fixture. The pole 161 may then be rotated to operate the rock arm 178 and links 169 to withdraw the latches 167 from latching position with respect to the flange 157 on the fixture. The supporting poles 160 and 161 may then be manipulated to raise the crosshead 159, carrying with it the supporting carriage 162 until the openings 188 and 163 in the crosshead and supporting carriage are opposite the supporting stem of the elevated unit 146, whereupon the crosshead and carriage may be moved laterally to free them from any connection with the elevated unit.

If by chance the fixture were not properly latched in the elevated unit 146, the weight of crosshead 159 would cause the fixture to drop until shoulder 193 rested on 189 of the elevated unit. This action, together with the upwardly extending projections 192 on latches 167 engaging with the downwardly extending projection 191 on ring 157, insures fool-proof operation in all possible circumstances.

It is obvious that the fixture 138 may be connected and disconnected manually without the use of a tool. To disconnect the fixture manually, the operator grasps the neck of the fixture and presses inwardly on the downward extensions 166, thus freeing the latch members from engagement with the shoulder 148 of the elevated unit. The fixture can then be slipped downwardly away from the elevated unit to disconnect it.

Further modifications will be apparent to those skilled in the art and it is desired, therefore, that the invention be limited only by the prior art and the scope of the appended claims.

Having thus described my invention, what I claim and desire to secure by Letters Patent is:

1. A fixture construction for use in an elevated position above the reach of an operator on the floor and for use with a fixture connecting and disconnecting apparatus, said fixture comprising a permanent unit having provisions for securing it permanently in an elevated position, and a detachable unit, said permanent unit comprising wiring terminals and contacts, said detachable unit comprising lamp holding means and contacts for detachable engagement with the contacts of the permanent unit, means for securing said detachable unit to said permanent unit comprising latch means having a movable latch member mounted on one of said units and a catch member mounted on the other unit for engagement with said latch member, said permanent unit having means for engagement with said connecting and disconnecting apparatus for positioning it, said latch member having latch movement controlling means engageable with actuating means on said apparatus when said apparatus is positioned by said permanent unit.

2. A fixture construction for use in an elevated position above the reach of an operator on the floor and for use with a fixture connecting and disconnecting apparatus, said fixture comprising a permanent unit having provisions for securing it permanently in an elevated position, and a detachable unit, said permanent unit comprising wiring terminals and contacts, said detachable unit comprising lamp holding means and contacts for detachable engagement with the contacts of the permanent unit, means for securing said detachable unit to said permanent unit comprising latch means having a movable latch member mounted on one of said units and a catch member mounted on the other unit for engagement with said latch member, said permanent unit having means for engagement with said connecting and disconnecting apparatus for positioning it, said latch member having latch movement controlling means engageable with actuating means on said apparatus when said apparatus is positioned by said permanent unit, said detachable unit having means for detachable engagement with a raising and lowering carriage of said apparatus.

3. A fixture construction for use in an elevated position above the reach of an operator on the floor and for use with a fixture connecting and disconnecting apparatus, said fixture comprising a permanent unit having provisions for securing it permanently in an elevated position, and a detachable unit, said permanent unit comprising wiring terminals and contacts, said detachable unit comprising lamp holding means and contacts for detachable engagement with the contacts of the permanent unit, means for securing said detachable unit to said permanent unit comprising latch means having a movable latch member mounted on one of said units and a catch member mounted on the other unit for engagement with said latch member, said permanent unit having means for engagement with said connecting and disconnecting apparatus for positioning it, said latch member having latch movement controlling means engageable with actuating means on said apparatus when said apparatus is positioned by said permanent unit, said detachable unit having means for detachable engagement with a raising and lowering carriage of said apparatus, said positioning means comprising means for holding a carriage support of said apparatus against downward movement.

4. A fixture construction comprising an elevated unit and a lighting unit detachably secured thereto, said elevated unit having readily engageable and disengageable electrical contacts, and an annular shoulder, said lighting unit having electrical contacts readily engageable and disengageable with respect to the elevated unit contacts in different positions of rotative adjustment and having a laterally movable latch member engageable and disengageable with respect to said annular shoulder in different positions of rotative adjustment, said latch member being provided with easily accessible tool engageable means for engaging a latch releasing tool.

5. A fixture construction comprising an elevated unit and a lighting unit detachably secured thereto, said elevated unit having readily engageable and disengageable electrical contacts, and an annular shoulder, said lighting unit having electrical contacts readily engageable and disengageable with respect to the elevated unit contacts in different positions of rotative adjustment and having a laterally movable latch member engageable and disengageable with respect to said annular shoulder in different positions of rotative adjustment, said latch member being provided with easily accessible tool engageable means for engaging a latch releasing tool, said lighting unit having carriage engaging means readily engageable and disengageable with respect to a carriage for raising and lowering the lighting unit with respect to the elevated unit.

6. A fixture construction for use in an elevated position above the reach of an operator on the floor and for use with a fixture connecting and disconnecting apparatus, which apparatus has a raising and lowering carriage and a carriage support, said fixture comprising a permanent unit having provisions for securing it permanently in an elevated position and a detachable unit, said permanent unit comprising wiring terminals and a mechanical connector member, said detachable unit comprising a reflector and a mechanical connector member for ready detachable engagement with said first mechanical connector member, said detachable unit having positioning means for detachable engagement with the raising and lowering carriage of said apparatus, and said permanent unit having positioning means for detachable engagement with said carriage support for holding said carriage support against downward movement.

7. A fixture construction comprising an elevated unit and a lighting unit detachably secured thereto, said elevated unit having readily engageable and disengageable electrical contacts, and an upwardly facing shoulder, said lighting unit having electrical contacts readily engageable and disengageable with respect to the elevated unit contacts and having a laterally movable latch member engageable and disengageable with respect to said shoulder and said latch member being provided with easily accessible manually operable means for operating the latch to release the lighting unit from the elevated unit.

8. A fixture construction for use in an elevated position above the reach of an operator on the floor and for use with a fixture connecting and disconnecting apparatus, which apparatus has a raising and lowering carriage and a carriage guide, said fixture comprising a permanent unit having provisions for securing it permanently in an elevated position and a detachable unit, said permanent unit comprising wiring terminals and a mechanical connector member, said detachable unit comprising a fixture and a mechanical connector member for ready detachable engagement with said first mechanical connector member, said detachable unit having positioning means for detachable engagement with the raising and lowering carriage of said apparatus, and said permanent unit having positioning means for detachable engagement with said carriage guide for guiding said carriage into position for connecting and disconnecting said detachable unit.

WESLEY WILSON.